United States Patent [19]

Dillon

[11] Patent Number: 4,465,282

[45] Date of Patent: Aug. 14, 1984

[54] MUSICAL SYMBOL EDUCATIONAL GAME

[76] Inventor: Patty M. Dillon, 521 Delta St., Denver, Colo. 80221

[21] Appl. No.: 357,596

[22] Filed: Mar. 12, 1982

[51] Int. Cl.³ .............................................. A63F 3/00
[52] U.S. Cl. .................................. 273/247; 434/430; 434/251
[58] Field of Search .................... 273/93 C, 301, 302, 273/247, 259, 277, 296, 93 R, 243; 84/470 R, 471 R; 434/430, 251

[56] References Cited

U.S. PATENT DOCUMENTS

| | | | |
|---|---|---|---|
| 1,745,946 | 2/1930 | Murray | 273/296 |
| 4,000,897 | 1/1977 | York | 273/93 R X |
| 4,003,580 | 1/1977 | Haffey | 273/247 |
| 4,061,337 | 12/1977 | Callender | 273/243 |

OTHER PUBLICATIONS

Super Sandwich, Teaching Concepts Inc., 1973.

Primary Examiner—Richard C. Pinkham
Assistant Examiner—Matthew L. Schneider
Attorney, Agent, or Firm—Wm. Griffith Edwards

[57] ABSTRACT

An educational game for facilitating the teaching of the recognition of musical symbols by elementary school pupils comprises an instruction chart representing football players and musical symbols and presenting similarities between player position names and the names of the musical notes. The game is played on a board representing a football field and movable pieces are attached to the board to indicate team positions. Flashcards showing the musical symbols on one side and the names of the symbols on the other are used to secure pupil recognition of the symbols and to position the team piece favorably upon correct recognition by the pupil.

5 Claims, 11 Drawing Figures

MUSICAL SYMBOL EDUCATIONAL GAME

This invention relates to an educational game in the field of music instruction and particularly to an improved game for teaching elementary school children the basic notational signs or symbols used in music.

BACKGROUND OF THE INVENTION

Various teaching aids and games have been devised for aiding the teaching of students to read music. It is desirable to provide improved and easily used devices and procedures for teaching elementary school children the meaning and significance of the basic symbols or notations employed in written music. Accordingly, it is an object of this invention to provide an improved educational game for teaching children the basic symbols or notational signs used in written music.

It is another object of this invention to provide an improved game apparatus for teaching children in groups to learn to read easily and accurately the basic musical notations.

It is a further object of this invention to provide a game apparatus to utilize elementary grade pupils' familiarity with an athletic game to facilitate their learning of and familiarity with the musical symbols.

SUMMARY OF THE INVENTION

Briefly, in carrying out the objects of this invention in one embodiment thereof, a game board is provided which includes a representation of a football field including the ten yard lines marked on the one hundred-yard field. Along opposite sides of the field, overlying strips are provided and two figures of football players are provided with means for attaching them to the strips at selected ones of the ten yard lines to represent the positions of the teams. The two players represent the two opposing teams. A "pregame" chart is provided which shows the musical symbols associated with respective ones of the players on a football team and a point value for each player. This is used for instructing the pupils who are to play the game. A set of flashcards is provided, each card having a musical symbol on one side and the name of the symbol on the other. Other cards may have the symbol on one side and a football player's position on the other.

During the playing of a game, the students are divided into two teams, each with a captain. The flashcards are shown to a selected member of the team. If the member identifies the symbol correctly, the team is advanced for a first down. If he misses, it is a second down and the play goes to the next member of the team to try to advance the ball toward its goal by identifying correctly two flashcards. If the second team member fails, the play passes to the third who must identify three flashcards; and if he fails, the fourth member must identify four cards to make a first down. However, the quarterback probably will decide to punt, whereupon the play goes to the other team at its twenty-yard line. During the play by either team, a correct answer or answers, as the case may be, give the team a first down.

By playing the football game with a team and trying to win, the student responding to the flashcards readily learns the characteristics of the notes signified by the symbols or names on the flashcards.

DESCRIPTION OF PREFERRED EMBODIMENT

Figure 1:
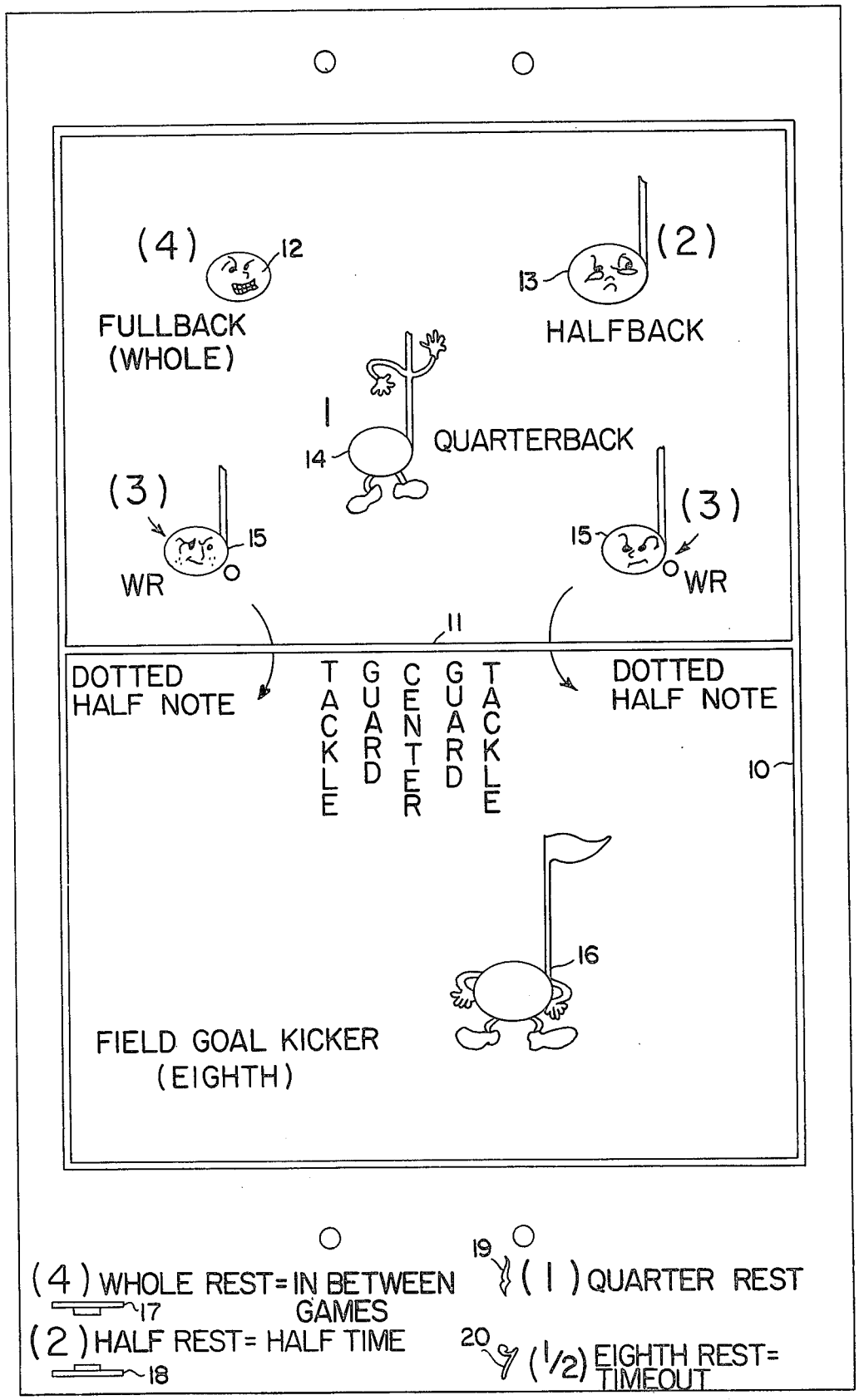
FIG. 1 is a plan view of an instruction chart for use with the game.

Referring now to the drawings, FIG. 1 illustrates the instruction chart used in preparing students for playing the game. The chart is rectangular and a rectangle 10 on the chart represents a football field with a midfield stripe 11. Five musical symbols or notes 12, 13, 14, 15, and 16 are shown in the upper half of the field and next to each in parenthesis is the number of beats in the duration of the note. These notes are designated by playing positions on a football team, the whole note 12 being the fullback, the half note 13 being one of the two halfbacks on the team, the quarter note 14 being the quarterback, and the two dotted notes 15 being wide receivers.

In the lower half of the field below the midfield stripe 11, the linemen are indicated by their position names and an eighth note 16 has been designated as the field goal kicker.

Below the field, four rest symbols are indicated. The whole rest 17, the half rest 18, and quarter rest 19, and the eighth rest 20 each are named together with their time in beats shown in parenthesis. As related to the football game, the whole rest is the time between scheduled games; the half rest, the time between halves of the game; the quarter rest, the time between quarters; and the eighth rest, a "timeout." The time of each rest in beats is indicated in the parenthesis.

The chart thus provides for the pupils an association between the different positions played by the members of the football team and the beat values and appearances of the different musical notes.

Figure 8:
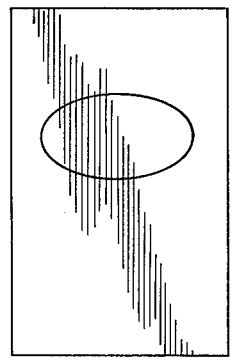
FIG. 8 is a face view of one side of a flashcard used with the game.
Figure 9:
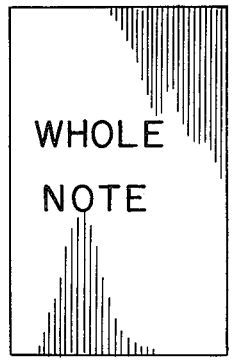
FIG. 9 is a face view of the back face of the flashcard of FIG. 8.
Figure 10:
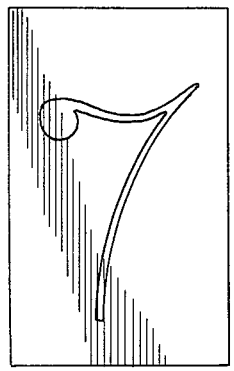
FIG. 10 is a face view of another flashcard.
Figure 11:
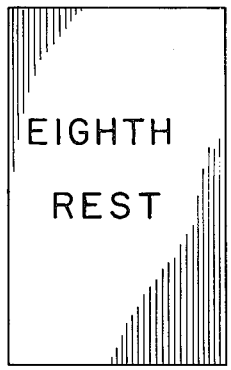
FIG. 11 is a view of the back face of the flashcard of FIG. 10.

The flashcards used with the game of this invention are represented by the "Whole Note" flashcard shown in FIG. 8 and in FIG. 9, which are the front and back views. The flashcard for the "Eighth Note" is shown similarly in FIGS. 10 and 11. Other similar cards not illustrated are provided to present the other signs, notes, and symbols employed with the game.

Figure 2:
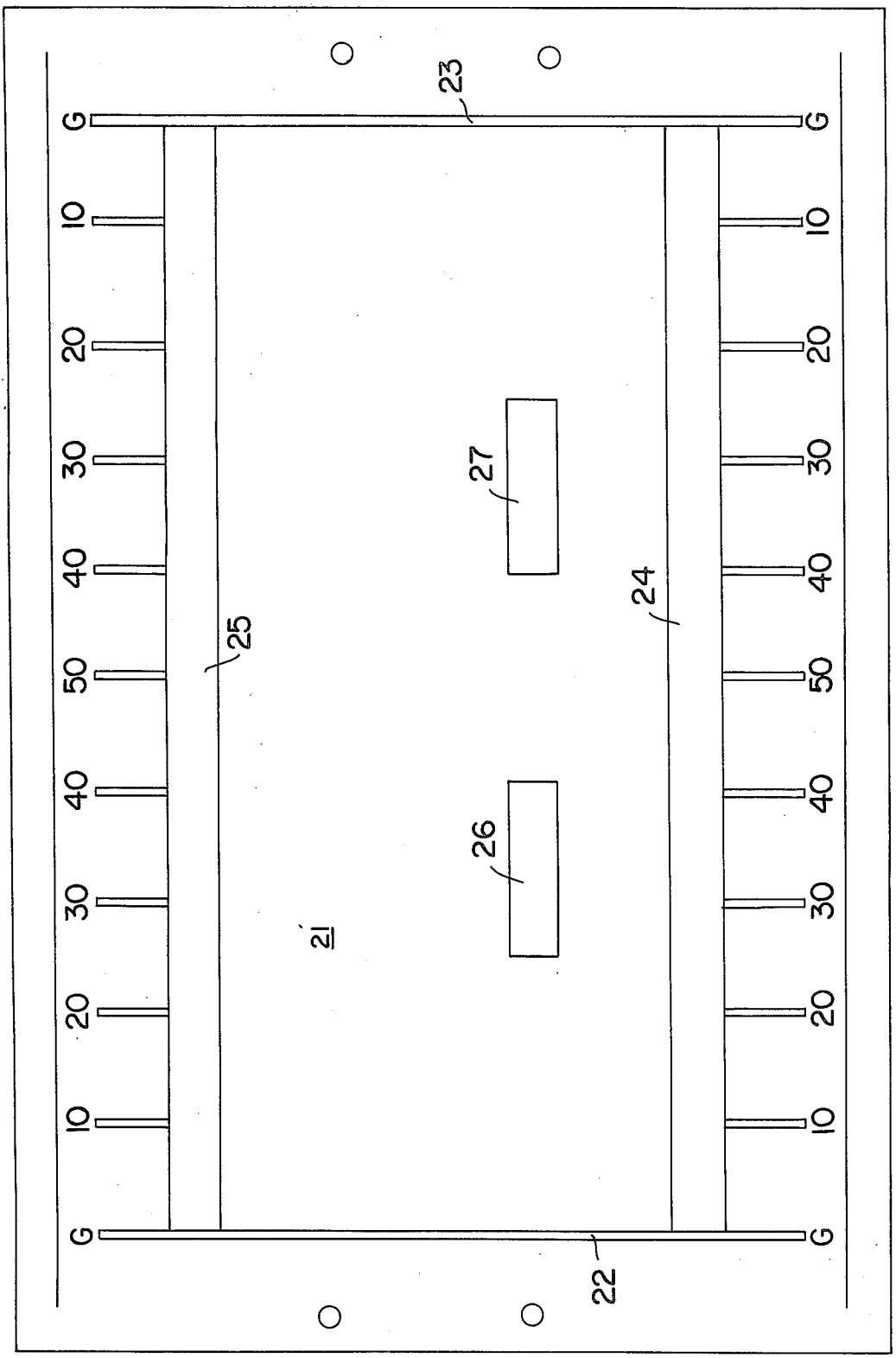
FIG. 2 is a plan view of the game board.

The game board as shown in FIG. 2 comprises a flat board 21 of suitable rigid material on which are marked the two goal lines 22 and 23 and locations of the ten-yard stripes or lines and provided with the usual ten-yard markers between the goals. Two strips 24 and 25 are secured to the board near the side of the field. These strips are attached to the board along their outer edges but are at least partially free along their inner edges. Two short strips 26 and 27 are attached to the board for attaching the two player figures when they are not in use.

Figure 3:
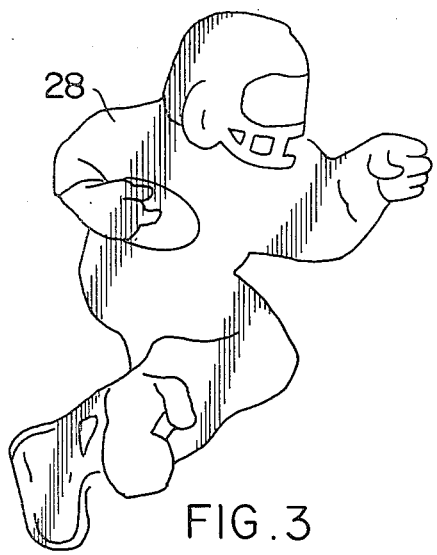
FIG. 3 is a plan view of a figure of a player for use on the board FIG. 2.
Figure 4:
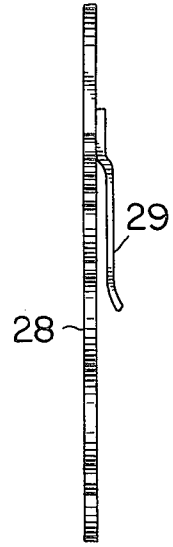
FIG. 4 is a side elevation view of the figure of FIG. 3.
Figure 6:
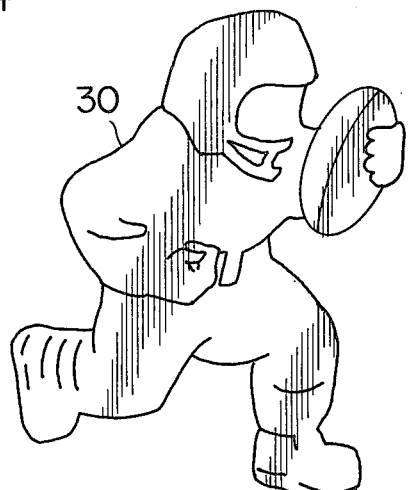
FIG. 6 is a side elevation view of another figure similar to that of FIG. 5.
Figure 7:
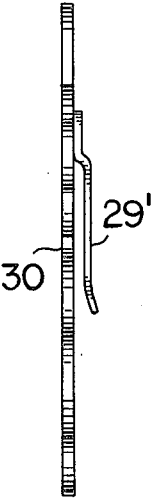
FIG. 7 is a side elevation view of the figure of FIG. 6.
Figure 5:
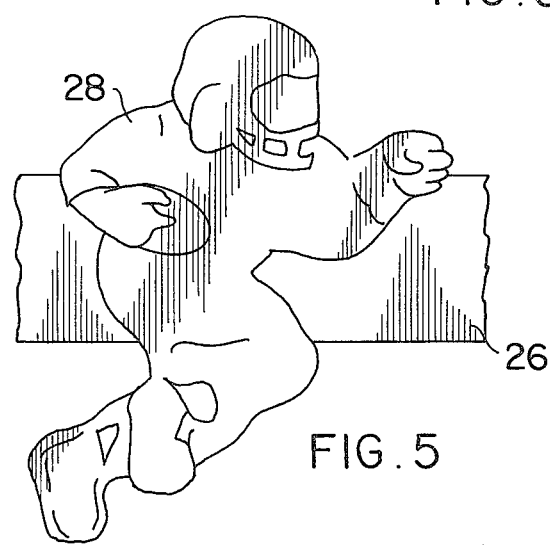
FIG. 5 is a plan view of the player figure of FIG. 3 attached to the game board of FIG. 2.

The player pieces used for marking the positions of the teams along the strips 24 and 25 during the playing of the game are shown in FIGS. 3 through 5. The player 28 in FIG. 3 is provided with a clip 29 in back as shown in FIG. 4; this clip is inserted in the free area between the board 21 and one of the strips 24 and 25 and when not in use is clipped to one of the short strips 26 and 27. The piece 28 is shown in FIG. 5 attached to the strip 26. These player pieces are used to mark the positions of their respective teams during the game. The player piece for the other team is shown in FIGS. 6 and 7 at 30 and is of the same construction as the piece 28 of FIGS. 3 and 4.

The flashcards used with the game of this invention are represented by the "Whole Note" flashcard shown in FIG. 8 and in FIG. 9, which are the front and back views. The flashcard for the "Eighth Note" is shown similarly in FIGS. 10 and 11. Other similar cards not illustrated are provided to present the other signs, notes, and symbols employed with the game.

PROCEDURE FOR USING THE GAME COMPONENTS

Various games and rules may be devised for using this game for assisting beginning pupils in attaining ready recognition of the musical symbols. The following is presented by way of example:

Presentation of the chart 10.

The pregame chart may be presented in the following manner:

1. With the pregame chart displayed so that all the children are able to see it, the teacher should discuss the game of football.

2. Discuss the football team, which is composed of different players and their playing positions and then observe that, like football, music is composed of different notes (or players), each of which holds a different position and is responsible for a different rhythmic aspect of the music.

The players' positions may be associated with the musical notes somewhat as follows:

1. The quarterback (quarter note)—The quarterback is the number one and the most important player on the team. The quarter note is like the quarterback and gets one beat.

2. The fullback (whole note)—The fullback is the biggest, heaviest man in the backfield. The whole note is the biggest, heaviest note in music. The whole note, like the fullback, gets four beats.

3. The halfback (half note)—In the usual offensive formations, there are a fullback and two halfbacks. The name "halfback" may suggest that the halfback is half as big as the fullback; so the half note is half as big as a whole note and receives two beats.

4. The wide receiver (dotted half note)—The wide receiver catches long passes and he is very important in terms of yardage gained. The dotted half note also is a long note and it receives three beats.

5. The field goal kicker (eighth note)—The field goal kicker is on the field only a short length of time. Like the field goal kicker, the eighth note appears for only a short period of time. The eighth note gets only half a beat.

6. The whole rest—Football players play very hard and when they are injured they need long rests between games. The whole rest also is a long rest—it gets four beats.

7. The half rest—The half rest is like half time in a football game. It is half as long as the whole rest and it gets two beats.

8. The quarter rest—The quarter rest is like the short periods between quarters in a football game. The quarter rest gets one beat.

9. The eighth rest (timeout)—When a football team gets in a jam and they need a few seconds to decide what to do, the team calls a "timeout." An eighth note rest is like the timeout—it is a very short rest—it gets half a beat.

The Game

1. The class should be divided into two teams and a "quarterback" chosen from each team.

2. The quarterbacks then should participate in a coin toss. The quarterback who wins the coin toss then elects to receive or kick the ball.

3. The team which elects to receive the ball always begins on its own twenty-yard line.

4. Each flashcard has a musical symbol or note on one side and the corresponding musical term on the other side. Show the flashcard to the first child in line for the offensive team and ask the child to identify the card.

If the child correctly identifies the card, the team gets a first down and the appropriate football player is moved forward ten yards on the game board toward the opposing team's goal.

If the card is not identified correctly, it is a second down; the football player does not move. The next child in line then must correctly identify two of the flashcards in order for the team to get the first down and move the player ten yards toward the opposing team's goal post.

Continue the game in the above manner. If the second down play is lost, it becomes a third down; and the next child must identify three cards to get a first down.

On a fourth down play, the quarterback may elect to go for a first down or punt the ball. If the quarterback elects to go for a first down, the next child in line must identify four flashcards correctly. On making a first down, the game continues as above. If the team does not make a first down, the opposing team gets the ball and they proceed toward the opposite goal in the manner described above. If the quarterback elects to punt the ball instead of going for a first down, the opposing team begins the play procedure on their own twenty-yard line.

5. Field goals—If the offensive team gets to the opponents' thirty-yard line and it is a fourth down situation, the quarterback may elect to go for a first down or the team may try for a field goal. For a field goal, the child in line must identify one flashcard correctly; then the team scores three points.

6. A touchdown is scored when the offensive team crosses their opponents' goal line and scores six points. To earn the extra point, the child that scored the touchdown must identify one more flashcard correctly.

7. After a touchdown or a field goal, the ball is punted to the opponents' twenty-yard line; and the opposing team takes over.

Suitable penalties may be assessed during the game upon misconduct of a member or members of either team.

While the invention has been described in connection with a specific embodiment, other arrangements and modifications will occur to those skilled in the art. Therefore, it is not desired to limit the invention to the details disclosed and it is intended by the appended claims to cover all modifications which fall within the spirit and scope of the invention.

I claim:

1. A game to be played by two opposing teams of students for use as a tool for facilitating the education of elementary pupils in learning the basic symbols and notations used in music which comprises:
   a pregame instruction chart bearing the durational symbols of musical notation, each equated on a time beat basis to a respective term used in the game of football,
   a game board bearing the representation of a football field with ten-yard lines and goal lines,
   a respective playing piece representing each team for positioning on said board to indicate the position of the team on the playing field; and
   a set of flash cards, each bearing a single musical symbol on one side and a corresponding identification of the symbol on its other side, whereby the movement of the respective teams playing pieces may be governed by an individual player on each team taken in turn and dependent upon his recognizing or not recognizing a flash card exhibited to such player at his turn,
   wherein said identification on said other side of at least some of said flash cards is a football term corresponding to said symbol on said one side.

2. A game to be played by two opposing teams of students for use as a tool for facilitating the education of elementary pupils in learning the basic symbols and notations used in music which comprises:
   a pregame instruction chart bearing the durational symbols of musical notation, each equated on a time beat basis to a respective player position on a team and the team function of that player,
   a game board bearing the representation of a football field with ten yard lines and goal lines,
   a respective playing piece representing each team for positioning on said board to indicate the position of the team on the playing field; and
   a set of flash cards, each bearing a single musical symbol on one side and a corresponding identification of the symbol on its other side, whereby the movement of the respective team's playing pieces may be governed by an individual player on each team taken in turn and dependent upon his recognizing or not recognizing a flash card exhibited to such player at his turn, wherein said identification on said other side of at least some of said flash cards is the name of said symbol on said one side.

3. A game as recited in claim 1 or claim 2 wherein said board includes means for attaching said player pieces along the length of the field at selected positions, each piece having an attaching member on one side thereof.

4. A game as recited in claim 3 wherein said means for attaching said pieces comprises a strip of material secured along its length and having free portions for receiving said attaching member on the player pieces for securing the piece in position.

5. The game as recited in claim 1 or 2 wherein said chart relates the individual player positions by similarity of names to the respective names of the notes.

* * * * *